United States Patent
Brockman et al.

(10) Patent No.: US 6,249,572 B1
(45) Date of Patent: Jun. 19, 2001

(54) TRANSACTION CONTROL APPLICATION PART (TCAP) CALL DETAIL RECORD GENERATION IN A COMMUNICATIONS NETWORK

(75) Inventors: Pierce Edward Brockman, Garland; Gerald Ray Lawson, Sachse; Tanveer Zamir, Plano; Gaurang S. Kalyanpur, Allen, all of TX (US)

(73) Assignee: Inet Technologies, Inc., Richardson, TX (US)

( * ) Notice: Subject to any disclaimer, the term of this patent is extended or adjusted under 35 U.S.C. 154(b) by 0 days.

(21) Appl. No.: 09/093,824

(22) Filed: Jun. 8, 1998

(51) Int. Cl.$^7$ ................................................. H04M 15/00
(52) U.S. Cl. ........................ 379/133; 379/113; 379/112; 379/134; 379/34
(58) Field of Search .................... 379/113, 133, 379/134, 34, 112, 114; 370/394, 470, 471, 472

(56) References Cited

U.S. PATENT DOCUMENTS

| | | | |
|---|---|---|---|
| 5,008,929 | * 4/1991 | Olsen et al. | 379/112 |
| 5,333,183 | 7/1994 | Herbert | 379/112 |
| 5,426,688 | 6/1995 | Anand | 379/5 |
| 5,438,570 | 8/1995 | Karras et al. | 370/94.2 |
| 5,448,624 | 9/1995 | Hardy et al. | 379/67 |
| 5,457,729 | 10/1995 | Hamann et al. | 379/2 |
| 5,473,596 | 12/1995 | Garafola et al. | 370/13 |
| 5,475,732 | 12/1995 | Pester, III | 379/34 |
| 5,488,648 | 1/1996 | Womble | 375/13 |
| 5,521,902 | 5/1996 | Ferguson | 370/13 |
| 5,539,804 | 7/1996 | Hong et al. | 379/33 |
| 5,550,914 | 8/1996 | Clarke et al. | 379/230 |
| 5,550,984 | 8/1996 | Gelb | 395/200.17 |
| 5,579,371 | * 11/1996 | Aridas et al. | 379/34 |
| 5,590,171 | 12/1996 | Howe et al. | 379/33 |
| 5,592,530 | * 1/1997 | Brockman et al. | 379/34 |
| 5,680,437 | * 10/1997 | Segal | 379/10 |
| 5,680,442 | 10/1997 | Bartholomew et al. | 379/67 |
| 5,694,451 | 12/1997 | Arinell | 379/34 |
| 5,699,348 | 12/1997 | Baldon et al. | 370/242 |
| 5,699,412 | 12/1997 | Polcyn | 379/89 |
| 5,703,939 | 12/1997 | Bushnell | 379/113 |
| 5,706,286 | 1/1998 | Reiman et al. | 370/401 |

(List continued on next page.)

FOREIGN PATENT DOCUMENTS

| | | | |
|---|---|---|---|
| 0541145 A1 | 10/1992 | (EP) | H04M/3/36 |
| WO 97/05749 A3 | 2/1970 | (WO) | H04M/15/00 |
| WO 95/33352 | 12/1995 | (WO) | H04Q/7/34 |
| WO 97/05749 A2 | 2/1997 | (WO) . | |
| WO98/47275 | 10/1998 | (WO) | H04M/7/00 |

OTHER PUBLICATIONS

George Paviou et al., Intelligent Remote Monitoring, Oct. 16, 1995.

*Primary Examiner*—Stella Woo
*Assistant Examiner*—Quoc D. Tran
(74) *Attorney, Agent, or Firm*—Fulbright & Jaworski L.L.P.

(57) ABSTRACT

A system and method for generating call detail records in a Signaling System 7 (SS7) network is disclosed. Network monitors that are capable of non-intrusively capturing all signaling units in an SS7 network are used to generate a complete record for all TCAP transactions. Users configure CDR profiles that are used to filter the TCAP transaction records. A CDR application filters the TCAP records by parsing out signaling unit components that have been selected by the user in the CDR profile. The selected TCAP message components are then formatted into a CDR record which is sent to an external system, such as the user's billing system.

34 Claims, 1 Drawing Sheet

U.S. PATENT DOCUMENTS

| | | | |
|---|---|---|---|
| 5,712,908 | * | 1/1998 | Brinkman et al. .................... 379/119 |
| 5,729,597 | | 3/1998 | Bhusri ................................. 379/115 |
| 5,737,332 | * | 4/1998 | Corrigan et al. ..................... 370/394 |
| 5,737,399 | * | 4/1998 | Witzman et al. .................... 379/112 |
| 5,757,895 | * | 5/1998 | Aridas et al. ........................ 379/136 |
| 5,793,771 | | 8/1998 | Darland et al. ...................... 370/467 |
| 5,799,073 | * | 8/1998 | Fleischer, III et al. .............. 379/113 |
| 5,822,401 | | 10/1998 | Cave et al. .............................. 379/34 |
| 5,825,769 | | 10/1998 | O'Reilly et al. ..................... 370/360 |
| 5,828,729 | | 10/1998 | Clermont et al. ....................... 379/34 |
| 5,854,824 | | 12/1998 | Bengal et al. ........................... 379/34 |
| 5,854,835 | | 12/1998 | Montgomery et al. ............... 379/119 |
| 5,867,558 | | 2/1999 | Swanson ................................. 379/34 |
| 5,875,238 | * | 2/1999 | Glotho et al. ......................... 375/116 |
| 5,881,132 | * | 3/1999 | O'Brien et al. ........................ 379/35 |
| 5,883,948 | | 3/1999 | Dunn ..................................... 379/210 |
| 5,892,812 | | 4/1999 | Pester ..................................... 379/34 |
| 5,912,954 | * | 6/1999 | Whited et al. ....................... 379/115 |
| 5,920,613 | * | 7/1999 | Alcott et al. ......................... 379/114 |
| 6,028,914 | | 2/2000 | Lin et al. ................................ 379/14 |

* cited by examiner

TRANSACTION CONTROL APPLICATION PART (TCAP) CALL DETAIL RECORD GENERATION IN A COMMUNICATIONS NETWORK

RELATED APPLICATIONS

The present invention is related to pending applications assigned Ser. No. 09/057,940, entitled SYSTEM AND METHOD FOR MONITORING PERFORMANCE STATISTICS IN A COMMUNICATIONS NETWORK, filed Apr. 9, 1998; 09/092,428 entitled SYSTEM AND METHOD FOR DETECTING HIGH MESSAGE TRAFFIC LEVELS IN A COMMUNICATIONS NETWORK; 09/092,699, entitled SYSTEM AND METHOD FOR SIGNAL UNIT DATA STORAGE AND POST CAPTURE CALL TRACE IN A COMMUNICATIONS NETWORK; 09/092,256, entitled SYSTEM AND METHOD FOR GENERATING QUALITY OF SERVICE STATISTICS FOR AN INTERNATIONAL COMMUNICATIONS NETWORK; and 09/092,771 entitled SYSTEM AND METHOD FOR CORRELATING TRANSACTION MESSAGES IN A COMMUNICATIONS NETWORK, all filed Jun. 5, 1998; and 09/093,955, entitled SYSTEM AND METHOD FOR MONITORING SERVICE QUALITY IN A COMMUNICATIONS NETWORK, filed concurrently herewith. These applications are commonly assigned and are hereby incorporated by reference herein.

TECHNICAL FIELD OF THE INVENTION

The invention relates to generating call detail records in a signaling network, and more particularly to generating call detail records using TCAP messages in a Signaling System Seven (SS7) network.

BACKGROUND OF THE INVENTION

Common channel signaling networks, such as the Signaling System Seven (SS7) based signal system, use dedicated channels to pass digital messages between systems for call setup, call control, call routing, and other functions. These dedicated signaling channels are part of a network that is separate from the network that carries the actual voice and data signals. An SS7 network is a separate switching system which is used prior to, during, and at the end of an actual voice or data call. The SS7 network is used to route control information. Whenever two switches or elements have to pass call control information during or prior to a phone call, they pass this data via the SS7 signaling network.

There are three basic types of network node elements in an SS7 network. One of them is the Service Switching Point (SSP), which may be a central office switch, a tandem switch or an end office switch. A second principal node element is the Service Control Point (SCP). An SCP acts as a database query server for the rest of the network. An SCP is used in such applications as translating ported telephone numbers, routing 800 calls, tracking roamers in a cellular network, and Alternate Billing Service/Line Identification Database services (or ABS/LIDB) which provide operator-type services. The third principal node element is the Signal Transfer point (STP). An STP is essentially a packet switch that routes the messages from SSPs and SCPs to SSPs and SCPs.

It is possible to combine these three different types of nodes into a single node. However, in North America, they are typically not combined. An SSP performs only switch functions, an SCP only control functions, and an STP only signal transfer functions. In European telecommunications systems, all of these different functions may be combined into one node.

The SS7 network carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and bandwidth utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the network is such that STPs are typically deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs.

When any transaction or message is sent between two different devices on the network, it is often the case that the messages going from switch A to switch B travel one route on the network while the messages going from switch B to switch A travel a different route. The network surveillance equipment that monitors the link is designed to capture and correlate as much signaling information as possible regardless of network activity. Because of the different data paths that messages may take, it is difficult to do this correlation above what is called the transport layer when monitoring links at the STP sites. An example of an application level problem would be where a subscriber has a problem getting his/her calls delivered. The telephone company may attempt to fix the problem by doing a trace of all data pertaining to that subscriber's phone number, but the data may not all be located at one point. The data may be all in one STP, or split in some fashion, partially in one STP and partially in the other STP of a mated pair, which may be in a different city many miles away.

Accordingly, it is an object of the present invention to provide a monitoring system that correlates calls and transactions in a communications network and generates call detail record data from call and transaction records.

It is an additional object of the present invention to use Transaction Control Application Part (TCAP) messages in an SS7 network to generate call detail records.

SUMMARY OF THE INVENTION

These and other objects, features and technical advantages are achieved by a system and method wherein messages flowing through a communications network between the originating, intermediate, and terminating switches or end offices are captured and used to generate call detail records. A network of signal monitoring units capture and correlate all messages for a particular transaction. CDR profiles are used to determine which transaction records should be forwarded to a CDR processing application. The CDR profile comprises particular parameters that are used to identify relevant transactions. After a transaction record is selected, specific information is extracted to create a CDR record.

Users define both the CDR profile, which is used to select relevant transaction records, and the CDR format, which defines how the CDR data will be sent to the user. Typically, the CDR data is sent to the user in a formatted CDR stream which may be further processed by other applications, such as billing or fraud.

Typically, the CDR is generated when a call is completed. The CDR indicates the originating network, terminating network, and length of trunk usage for the call. Since the identity of the originating service provider is found in the CDR, along with the duration of the call, the CDR billing application is ideal for generating interconnection revenue for reciprocal compensation. The present invention does not directly generate bills or track SS7 bandwidth use. Instead, it is solely a system for collecting the CDR data. This data is then ported to a customer's external application, where the call can be rated and a bill or invoice can be generated for the transaction or call.

The system disclosed herein comprises a number of monitors which are capable of non-intrusively monitoring all of the links in a communication network, such as an SS7 network. CDR data is initially collected from the various SS7 links. The monitors that are connected to the links store the data in a binary format. The binary data is then continuously sent to the central server where it is stored to disk. This application can be used in conjunction with the monitor's server, or customers may choose to deploy a dedicated CDR server, separate from the system. The server also correlates partial CDRs that have been collected from different "legs" of each individual call to formulate a complete CDR. At the server, CDRs are formatted from binary into ASCII-formatted records based on a CDR format that is selected by the user. The size and processing power of the server are scaled based on the number of CDRs, the network-wide call rate, and the bandwidth capacity of the customer's transport network. The formatted CDR binary streams are sent to the user's billing system using any standard or customized File Transfer Protocol (FTP). Additional data formatting may be performed in the customer's external billing system.

In order to generate CDRs, users create profiles that tell the monitor system how to collect SS7 information from the signaling links. The profiles contain all of the information required to generate CDRs. Multiple profiles can be created to be used simultaneously on the system. The profiles may include parameters such as the calling party number, called party number, mobile identification number (MIN), point codes, and application type. Essentially, any component of a transaction signaling unit may be used as a filter parameter.

Accordingly, it is an feature of the present invention to provide a communications network monitoring system that generates binary CDRs and streams them to a CDR server. The CDR server formats each binary CDR into the required format and forwards the formatted CDR to an external system. Each CDR shall be generated according to the profile set up on the monitoring system by the user.

It is another feature of the invention that a CDR collection process on a CDR server collects all of the legs of a transaction and correlates them into a single CDR, which is then formatted into the required format. The CDR consists of multiple message signaling units (MSUs) that are related to a single TCAP transaction.

In one embodiment of the invention, the CDR server, which may or may not be a dedicated server, acts as a client and initiates the connection to the external system on a predefined port number. A configuration file on the CDR server designates an IP address and port where all the formatted CDRs are to be directed. All CDRs will be streamed to the external system and no application level protocol will be followed. The underlying protocol will be TCP/IP. All MSUs related to a single transaction are packetized in a single CDR and a CDR will be generated and sent for every transaction. The CDRs are destroyed as soon as they are successfully transmitted from the CDR server to the external system. No acknowledgment is expected from the external system for CDR receipt. For each unique pointcode in a profile the server spawns a TCP/IP connection to an external system to send CDRs. If the pointcode is repeated in multiple profiles, only one connection shall be established. A configuration file lists the pointcode to connection/port number mapping. If a pointcode is not listed in the configuration file, CDRs generated for this pointcode will be destroyed immediately. A log is kept to track when the connections are established or down and to track the numbers of CDRs sent and dropped hourly and daily.

In an alternative embodiment, the configuration file mapping method may be defined to provide a CDR profile to connection mapping. In this case, all CDRs generated by a profile are sent to the same destination.

In an additional embodiment, the CDR server stores CDRs on a local disk using a predefined file naming convention so that all CDRs for a profile are stored in one file. New files are created for a defined interval and, as soon as the file is closed, an external system can retrieve the file using FTP, or some other protocol.

It is an object of the present invention to provide users with the capability to select from a number of TCAP parameters which can be used to filter transaction records. Filters may be based upon called and calling numbers, or groups of digits within the called or calling numbers. Additionally, application types and point codes may be used as filter parameters.

Communications network monitoring equipment which may be used in conjunction with the present invention is disclosed in U.S. Pat. No. 5,592,530, entitled TELEPHONE SWITCH DUAL MONITORS; and in pending patent applications assigned Ser. Nos. 09/057,940, entitled SYSTEM AND METHOD FOR MONITORING PERFORMANCE STATISTICS IN A COMMUNICATIONS NETWORK; 09/092,428 entitled SYSTEM AND METHOD FOR DETECTING HIGH MESSAGE TRAFFIC LEVELS IN A COMMUNICATIONS NETWORK; 09/092,699 entitled SYSTEM AND METHOD FOR SIGNAL UNIT DATA STORAGE AND POST CAPTURE CALL TRACE IN A COMMUNICATIONS NETWORK; 09/092,256 entitled SYSTEM AND METHOD FOR GENERATING QUALITY OF SERVICE STATISTICS FOR AN INTERNATIONAL COMMUNICATIONS NETWORK; and 09/092,771 entitled SYSTEM AND METHOD FOR CORRELATING TRANSACTION MESSAGES IN A COMMUNICATIONS NETWORK, filed Jun. 5, 1998 the disclosures of which are hereby incorporated by reference herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
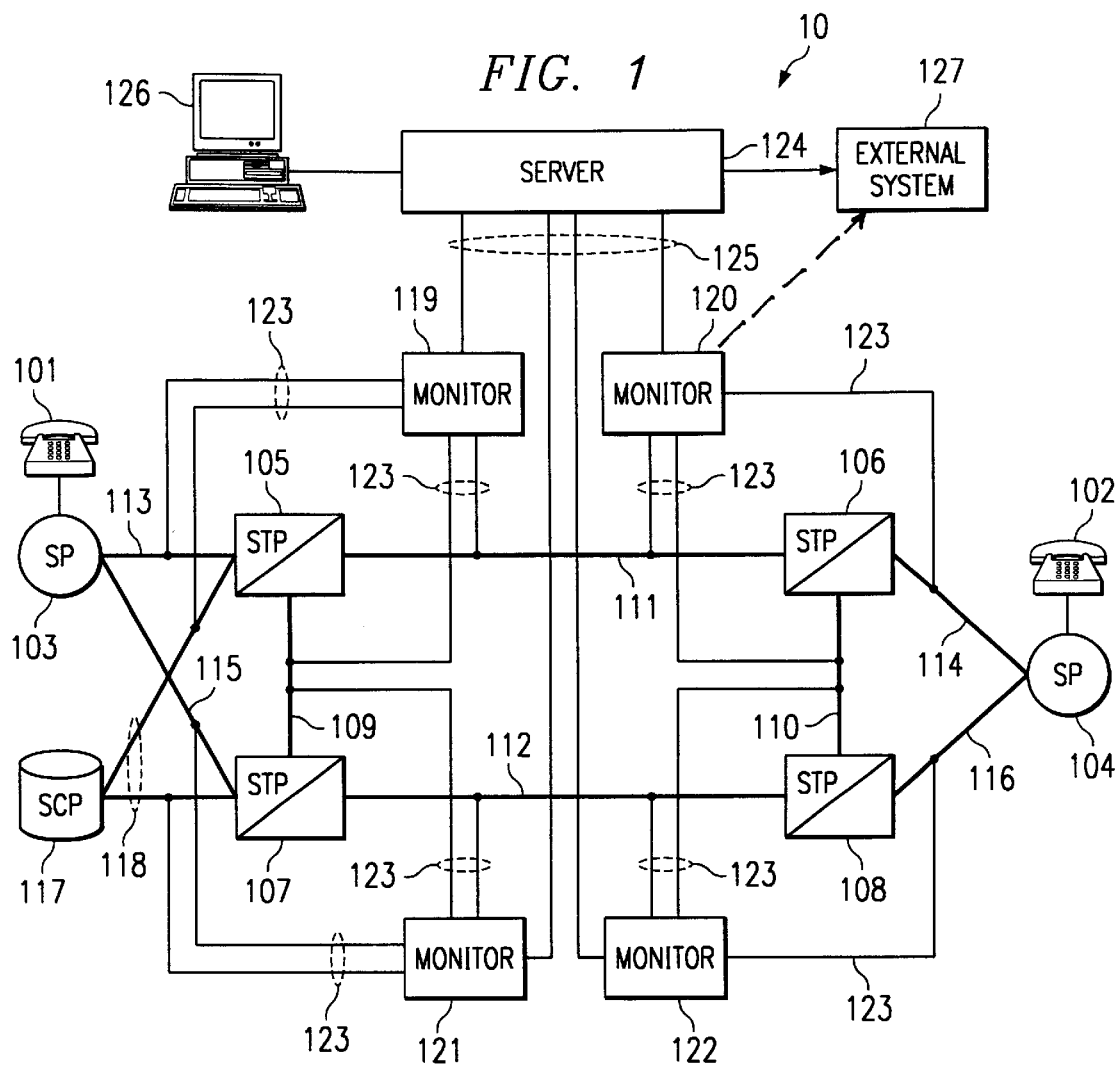
FIG. 1 is a block diagram of a system incorporating the present invention.

FIG. 1 is a block diagram of communications network 10 in which telephones 101 and 102 communicate via a signaling network, such as an SS7 network. It will be understood that telephones 101, 102 are used for illustration purposes only and that any voice or data communications device may be connected to the network. In the embodiment illustrated in FIG. 1, telephones 101 and 102 are connected to end offices 103 and 104, which may be Signaling Points (SP), as shown, or SSPs. End offices 103 and 104 are linked to each other through a signaling network comprised of STPs 105–108, which are connected via links 109–112. SPs 103 and 104 are connected to STPs 105–108 via links 113–116. Calls, transactions and other signals or messages between end office 103 and end office 104 may take any of a number of paths across links 109–116 and through STPs 105–108.

Typically, a series of signals that are related to one call or transaction will traverse across the same path through network 10 from one end office to another. For example, for a particular transaction, all signaling units sent from SP 103 may cross links 113, 111, and 114 through STPs 105 and 106. However, network problems or system failures may cause different signals for the same transaction to take different paths. It is also typical that signals traversing the system in the reverse direction may use a different path through the network. For example, for the same transaction illustrated above, signals from SP 104 may traverse links 116, 112, and 115 through STPs 108 and 107. Therefore, a single link or network element may not see all the messages or signals for one complete transaction or call.

In certain circumstances, such as for an 800 number call or for a call to an exchange or number that has been ported to a different switch, message may be sent to SCP 117 to perform various database look-up functions. Signals or messages are exchanged with SCP 117 via links 118. In other embodiments, there may be additional components in network 10, such as Service Nodes (SN) or Intelligent Peripherals (IP), which would require additional signal paths.

In network 10, monitors 119–122 are individually paired with STPs 105–108. Each monitor 119–122 is coupled to every link for a particular STP by connections 123, which may be embodied as a branch or tee off of links 109–116. This allows monitors 119–122 to capture or detect every signaling unit that is sent to, or from, each STP 105–108. As described in U.S. Pat. No. 5,592,530 and application Ser. No. 09/057,940, monitors 119–122 are coupled via an inter-monitor communications link (not shown) which allows monitors 119–122 to transfer captured signaling units and messages among themselves. Typically, the first monitor to detect a signaling unit for a call or transaction is designated as a controlling or anchor monitor. The other monitors then send any later detected signaling units for the same transaction or call to the anchor monitor. The anchor monitors correlates all of the messages from a particular transaction or call into a single record. Usually, each signaling unit is identified as belonging to a particular transaction by the Transaction Identifier (TID).

Monitors 119–122 are connected to server 124 via connection 125, which may be a Wide Area Network (WAN) or any other data network connection. Once a call or transaction record is complete, the record is then sent to server 124 for further processing. Monitors may determine that a record is complete when an end message is detected for that particular call or transaction. Workstation 126 is connected to server 124 and may be directly connected to monitor 119–122. Workstation 126 provides network service providers or other users with access to retrieve data or to configure server 124 or monitors 119–122

In the present invention, monitors 119–122 detect and correlate TCAP messages from network 10. These messages are used to generated binary call detail records (CDRs) which are streamed to server 124 over WAN 125. Server 124 formats each binary TCAP CDR stream into a format selected by a user or customer and forwards the formatted TCAP CDR data to the customer's external system 127. The TCAP CDR data may be sent to external system 127 either from server 124 or directly from the network monitors, such as from monitor 120 as illustrated.

The user sets up a profile on workstation 126, such as a SUN workstation. In a preferred embodiment, the user interacts with workstation 126 via a Graphical User Interface (GUI) to configure the CDR profile. The profile is a filter having certain criteria configured by the user. System 127 may be comprised of a server or other processor which is capable of using the CDR data to rate and bill transactions on network 10. In one embodiment, external system 127 is a quality of service application such as the system disclosed in pending application serial number 09/093,955 entitled SYSTEM AND METHOD FOR MONITORING SERVICE QUALITY IN A COMMUNICATIONS NETWORK, filed concurrently herewith, the disclosure of which is hereby incorporated by reference herein.

Typically, the CDRs are created at transaction termination. The binary CDRs are sent via Transmission Control Protocol/Internet Protocol (TCP/IP) to the server listed in the CDR profile for further processing. A collection process on server 124 then collects all legs of a transaction and correlates the data into a single CDR. The CDR consists of multiple signaling units which are related to a single transaction, for example, the entire TCAP dialogue, including prearranged ends and time-outs. Each CDR is assigned a unique sequence number during the CDR collection process. The CDR is then formatted as defined by the user and sent to external system 127. In one embodiment, server 124 acts as a client and initiates a connection to the external system on a predefined port number.

Monitors 119–122 are capable of monitoring a multitude of SS7 links at one time. A unique identifier, or CDR sequence number, is generated for every CDR and uniqueness is guaranteed system wide. The CDR application can be configured in a sampling mode with the sampling rate determined on a per profile basis. The maximum sampling rate is decided based on the monitor system sizing. Preferably, the sampling rate can be selected from 1% to 100% in increments of 1%. In the preferred embodiment, monitors 119–122 contain software that delivers the signaling units captured from the SS7 network to a CDR filtering process for evaluation. Server 124 is responsible for tracking all CDR configurations set up by the user and for downloading CDR configurations to monitors 119–122 as necessary. Depending upon the configuration selected by the user, monitors 119–122 determine if a message has passed the filter criteria. If a message does pass the criteria, it is sent to a tracking task located on monitors 119–122 and then to server 124. In the event a message does not match the characteristics defined by a user, the message will be discarded.

Server 124 may be a single server or it may be embodied as two or more servers having separate functions. For example, one server may act as a central information point for all entities of the monitoring system and another server may control CDR processes. Any entity needing common information can obtain that information from a monitoring system server database. The database control on the monitoring system server includes configurations for all monitor applications. In this embodiment, the CDR configuration information can be stored on the monitoring system server in a configuration file. At the start of a CDR generation session, the CDR configuration file is downloaded to specific monitors over network 125.

Either server 124, or a separate CDR server, maintains another CDR configuration file to provide mapping of CDR profile names to virtual connections. This file lists CDR profile names and the corresponding connection identifications on which external system is expecting the CDRs for that profile. The CDR configuration file also comprises a mapping of the virtual connection identifiers to their connection names. In the preferred embodiment, multiple CDR profiles can be mapped to a single virtual connection identifier, but a single CDR profile cannot be mapped to multiple connection identifiers.

Server 124, or the CDR server, performs CDR processing. The CDR process collects all binary CDRs from monitors 119–122 and format the CDRs. The formatted CDR is then sent via TCP/IP to an external system. Each profile in the configuration file can instruct monitors 119–122 to send binary CDRs to different servers or workstations 126. However, it is mandatory that a CDR collection process should be running and listening on the assigned IP address and port.

External system 127 shall act as a server and listen on a pre-defined port number for incoming CDRs. Server 124 shall act as a client and initiate a connection to the external system on a predefined port number. Server 124 is capable of spawning multiple connections based on the configuration file and the number of configurations are configurable. Server 124 is also capable of communicating with multiple external servers. Server 124 can send formatted CDRs that have been generated using different profiles to different servers.

In the preferred embodiment, the formatted CDRs are queued in a list to be sent to external system 127. If there is a loss of communication on a port, up to 512 CDRs shall be stored per connection. When the CDR queue is full, the CDRs will be deleted on a First-In-First-Out (FIFO) basis. On start-up, after a communication failure, any pre-existing CDRs shall be sent to the external system before any of the new CDRs are sent. A connection acceptance message from external system 127 contains the last sequence number received. Server 124 reads the sequence number and sends the next available CDR. In some situations, the first CDR transmitted after communication re-establishment may not be the CDR external system 127 was expecting. Thus, there is a potential for data loss if the connection is down for a long time.

The following messages are logged to a daily file on a per connection basis:
Connection Established;
Connection Down;
Number of CDRs Sent (per hour);
Number of CDRs Dropped (per hour); and
Daily Total Number of CDRs Sent and Dropped.
Local time and date are indicated on each message and the logical connection name is included on each line.

As discussed above, workstation 126 has a GUI configuration interface that enables users to select the signaling groups and point codes to be used in configuring the CDRs. The GUI allows users to add, modify, or delete CDR profiles. The CDR configurations are active until they are deleted. Once a profile is activated, the user is notified. The CDR profiles indicate the address and port for the external system 127, which is collecting the CDRs. All CDRs generated by a profile are sent to the destination IP address via TCP/IP.

Filters may be selected for called, calling and translated numbers based on the selected protocol, such as INAP, 800, or IS-41. The CDR configuration supports the use of wildcards for point codes or system nodes. Additionally, wildcards are supported for phone numbers. Wildcards allow the user to configure profiles which encompass all of the point codes, network nodes, or telephone numbers having a common series of numbers, such as a common area code or exchange. For example, the wildcard telephone number "1-NPA-*" for a called number can be used to filter out all records for calls or transactions to a telephone number in the "NPA" area code.

TABLE 1 is a list of the parameters that customers can use to create CDR profiles. The CDR profiles tell monitors 119–122 how to collect SS7 information from the signaling links. The profiles contain all of the information that is necessary to generate CDRs. A single customer can generate multiple profiles and each profile can include different parameters.

TABLE 1

| Call State that Triggers the CDR Generation |
| --- |
| Address Complete |
| Answer |
| Call Termination |
| Application Type |
|     ANSI ISUP |
|     ITU ISUP |
|     ITU TUP |
|     ITU NUP |
|     IS-41 |
|     CLASS |
|     LIDB |
|     AIN |
|     INAP |
|     National Variants |
|     Toll Free/800 |
| Point Codes |
|     OPC |
|     DPC |
| Calling Party Numbers |
| Called Party Numbers |
| Translated Numbers |
| Dialed Digits |
| Destination Digits |
| Mobile Identification Number (MIN) |
| Routing Numbers |
| Account Numbers |
| Electronic Serial Number |
| Location Routing Number |

TABLE 2 lists the header fields of a preferred CDR format and the definitions of the field contents.

TABLE 2

| | |
|---|---|
| Length of Entire CDR | |
| Length of Fixed Fields | Indicates the length of the fixed CDR fields. The value is the number of bytes after the "Length of Fixed" field to the "User Field Length" field. |
| CDR Sequence Number | Numeric value that uniquely identifies the call record within the monitoring system. Uniqueness is guaranteed system wide. The system also uses this number to indicate the delivery monitor and its process ID. |
| CDR Condition Indicator | Indicates various conditions within a call/transaction. |
| Date/Time of Transaction Start | GMT time when a transaction begins. |
| Date/Time of Transaction End | GMT time, when a transaction end message is encountered. |
| CIC | Carrier Identification Code |
| OPC | Network indicator, protocol as well the origination pointcode of the call. |
| DPC | Network indicator, protocol as well the destination pointcode of the call. |
| Abort Reason | Abort cause of the transaction. |
| Application | SSN of the concerned application. |
| Number of Calling Party Digits | The number of digits in the calling party number. |
| Calling Party Number | The phone number identified as the calling phone number. |
| Number of Called Party Digits | The number of digits in the called party number. |
| Called Party Number | The phone number identified as the called phone number. |

TABLE 3 lists the user defined fields of a preferred CDR format and the definitions of the field contents.

TABLE 3

| | |
|---|---|
| User Fields Length | Indicates the length of the user-defined CDR fields section. The value is the number of bytes after this field to the end of the user defined fields. |
| MSU Fields Length | Indicates the total length of the MSU section. The value is the number of bytes after this field to the end of the CDR. |
| Number of MSUs | Indicate the total number of the MSUs in this CDR. |
| Time Stamp | GMT time, when this transaction was encountered. |
| Link Number | Indicates the link identifier on which the MSU was encountered. |
| MSU Length | Indicates the total length of the MSU following. |
| MSU | Actual MSU that was captured by the monitoring system. |

Table 4 lists the fields for a CDR format with Integrated Services Digital Network -User Part (ISUP) parameters.

TABLE 4

RIN Parameter
UUI Octets
USR Messages
UUI Indicator
Calling Party Nature of Address
Redirecting Number Nature of Address
Original Called Number Nature of Address
Location Number Nature of Address
Redirection Information
TMR Value
Calling Party's Category
Number of Redirecting Number Digits
Redirecting Number
Number of Original Called Digits
Original Called Number
Number of Location Number Digits

TABLE 4-continued

Location Number
User Definable Parameters

In an alternative embodiment, the CDR billing application may be enhanced to include a generic CDR formatter. This formatter would have a GUI front-end configurator that allows multiple possibilities for defining CDR contents. This would allow customers to tailor the CDR to their particular needs. Additionally, the TCAP CDR generation system may be used for service-based billing, including Intelligent Network services based on the INAP/AIN applications.

Figure 2:
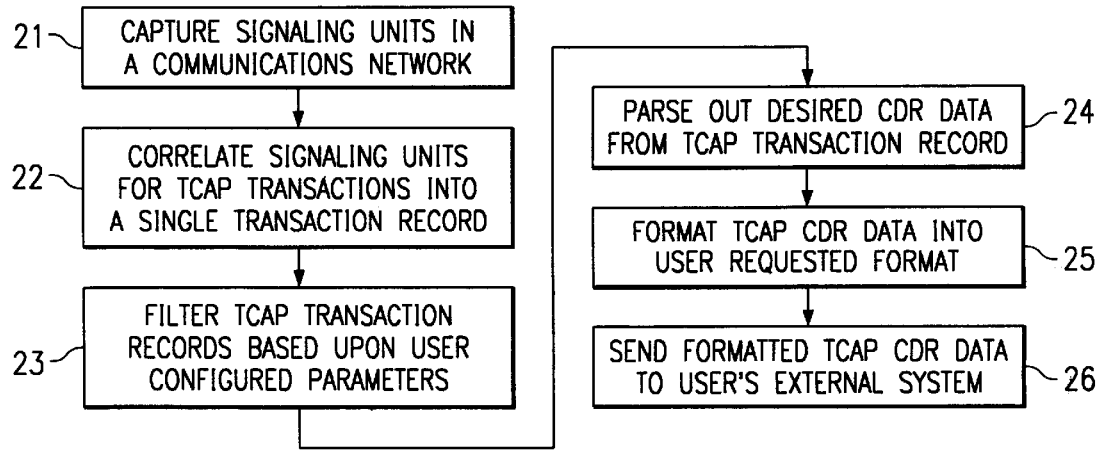
FIG. 2 is a flowchart which illustrates the creation of TCAP CDRs in accordance with the present invention.

Flowchart 20 of FIG. 2 illustrates the gathering of TCAP CDR data and sending the data to a user's external system. In step 21, network monitors capture signaling units from the links in a communications network, such as the SS7 network illustrated in FIG. 1. These signaling units are then correlated by the monitors in step 22 and messages that relate to the same transaction or call are combined in a single record. As discussed above, monitors 119–122 may exchange signaling units across an inter-monitor communication link so that all messages that relate to a single transaction or call are correlated on an anchor monitor.

In step 23, after a TCAP transaction is completed and a transaction record is generated, the TCAP CDR system filters the record based upon the parameters configured by the user. The processing in step 23 may be completed by a processor on monitors 119–122 or by server 124. The server is capable of passing CDR filter data to each monitor so that filtering may be performed remotely on each monitor. Then, in step 24, the monitors parses our the desired data that the user has requested to configure the TCAP CDRs.

Alternatively, steps 23 and 24 may be performed on a central CDR server, such as server 124. Monitors 119–122 are capable of forwarding TCAP transaction records to server 124, which can in turn apply the filter criteria selected by the user. Once the records have been filtered, then server 124 parses out the selected components of the signaling units in the TCAP record in step 24. In other embodiments, the link monitors and the CDR server may cooperatively perform the functions of filtering records and parsing signaling unit components.

Once the desired signaling unit components have been parsed from the TCAP transaction record, the data is combined in step 25 into the CDR format that has been requested by the user. Finally, in step 26, the TCAP CDR data is sent to the user's external system. The TCAP CDR data may be sent to the external system as a continuous data stream. Alternatively, the TCAP CDR data may be stored by the monitoring system prior to being forwarded to the user. For example, server 124 or monitors 119–122 may be coupled to a database (not shown) that is capable of storing filtered TCAP transaction records or formatted TCAP CDRs.

Although the present invention and its advantages have been described in detail, it should be understood that various changes, substitutions and alterations can be made herein without departing from the spirit and scope of the invention as defined by the appended claims.

What is claimed is:

1. A system for compiling call detail record information for transactions in a communications network, wherein a plurality of interlinked network monitoring devices capture signaling units from links within said network and wherein said monitoring devices correlate said signaling units into a plurality of transaction records, said system comprises:

a server for receiving said transaction records from said monitoring units, said server comprising:

a first filter configured to select certain ones of said received transaction records;

a second filter configured to remove selected data from said certain ones of said transaction records;

a formatter for compiling said selected data into a format to be transmitted;

connections to one or more external systems, each of said external systems capable of receiving said formatted selected data, wherein said formatted selected data is placed in a queue for transmission to the external system;

if communication to said external system is interrupted during the transmission so that the formatted selected data cannot be transmitted, storing said formatted selected data;

if communication to the external system is restored, sending said stored formatted selected data to the external system; and a sequence number, sent by the external system to the server, indicating a next one of said formatted selected data to be transmitted when said communication is restored.

2. The system of claim 1 wherein said received transaction records correspond to Transaction Control Application Part (TCAP) transaction records.

3. The system of claim 1 wherein said first filter, said second filter and said formatter comprise a software program having configurable parameters.

4. The system of claim 3 further comprising a workstation coupled to said server, wherein users configure said configurable parameters via said workstation.

5. The system of claim 1 wherein said first filter comprises parameters selected from the group consisting of:

Time of Transaction Start;

Time of Transaction End;

Origination Point Code;

Destination Point Code;

Abort Reason;

Application Type;

Calling Party Digits;

Called Party Digits;

Routing Number;

Account Number;

Translated Number;

Mobile Identification Number;

Electronic Serial Number; and

Location Routing Number.

6. A communications network monitoring system, wherein monitoring devices capture signaling units from communications links coupled to a particular node in said network, and wherein said signaling units are correlated into transaction records, said system comprises:

a first filter for selecting certain ones of said transaction records; and a second filter for removing selected data from said certain ones of said transaction records; and a server data link coupled to a monitoring system server, wherein said selected data is sent to said server via said server data link, and wherein said monitoring system server comprises:

a formatter for compiling said selected data into a format to be transmitted to an external system, wherein said formatted selected data is placed in a queue for transmission to said external system;

a storage device capable of storing said formatted selected data if communication to the external system is interrupted during the transmission so that the formatted selected data cannot be transmitted;

a processor capable of sending said stored formatted selected data to said external system if communication to the external system is restored so that data can be sent to the external system; and a sequence number, sent by said external system to the server, indicating a next one of said formatted selected data to be transmitted when said communication is restored.

7. The device of claim 6 wherein said transaction records correspond to Transaction Control Application Part (TCAP) transactions.

8. The device of claim 6 wherein said first filter and said second filter comprise a software program having configurable parameters.

9. The device of claim 8 wherein said device receives updated parameters from said server via said server data link.

10. The device of claim 6 wherein said server data link comprises a Wide Area Network (WAN).

11. The device of claim 6 wherein said second filter creates a call detail record (CDR) bit stream to be sent to said server.

12. A method for generating Transaction Control Application Part (TCAP) call detail records (CDRs) in a communications network, comprising:

capturing signaling units in a communications network;

correlating said signaling units into a plurality of transaction records; filtering said plurality of transaction records;

removing selected signaling unit data from each of said selected TCAP transaction records;

compiling said selected signaling unit data into a format to be transmitted to an external system, wherein said formatted selected signaling unit data are placed in a queue for transmission to said external system;

transmitting said selected signaling unit data to said external system;

if communication to the external system is interrupted during the transmission so that the formatted selected data cannot be transmitted, storing said formatted selected signaling unit data;

if communication to the external system is restored so that data can be sent to the external system, sending said stored formatted selected signaling unit data to said external system; and receiving a sequence number, sent by said external system to the server, indicating a next one of said formatted selected data to be transmitted when said communication is restored.

13. The method of claim 12 further comprising the step of:

formatting said selected signaling unit data into a requested CDR format prior to said sending step.

14. The method of claim 12 wherein said communications network is a Signaling System Seven (SS7) network.

15. The method of claim 12 further comprising the steps of:

configuring said user-configured filter parameters.

16. The method of claim 15 wherein said filter parameters comprise calling number digits.

17. The method of claim 15 wherein said filter parameters comprise called number digits.

18. The method of claim 15 wherein said filter parameters comprise point codes corresponding to nodes within said communication network.

19. The method of claim 15 wherein said filter parameters comprise a selected application type.

20. The method of claim 12 wherein said selected signaling unit data comprises data selected from the group consisting of:
Time of Transaction Start;
Time of Transaction End;
Origination Point Code;
Destination Point Code;
Abort Reason;
Application Type;
Calling Party Digits;
Called Party Digits;
Routing Number;
Account Number;
Translated Number;
Mobile Identification Number;
Electronic Serial Number; and
Location Routing Number.

21. The method of claim 13 wherein said requested CDR format comprises data selected from the group consisting of:
Number of Signaling Units;
Signaling Unit Length;
Actual Signaling Unit; and
Time Stamp When Signaling Unit was Encountered.

22. The method of claim 12 wherein each of said transaction records represent separate transactions on said network.

23. The method of claim 12 wherein filtering in said filtering step is based upon user-configured filter parameters to identify selected TCAP transaction records.

24. A method for receiving Transaction Control Application Part (TCAP) transaction call detail records (CDRs) comprising:
configuring parameters for a signaling unit filter, wherein a network monitoring system uses said filter to select TCAP transaction records based upon said parameters;
selecting a CDR configuration, wherein said CDR configuration is used by said network monitoring system to retrieve and format certain components of said transaction signaling units;
receiving formatted TCAP CDR signals from a queue in said monitoring system;
if communication with the monitoring system is interrupted so that the formatted TCAP CDR signals cannot be received, determining a sequence number that identifies an expected next one of said formatted TCAP CDR signals to be received;
if communication to the external system is restored so that the formatted TCAP CDR signals can be received from the monitoring system, then sending said sequence number to said monitoring system and receiving stored formatted TCAP CDR signals from the monitoring system 25. The method of claim 24 wherein said TCAP CDR signals are received from a monitoring system server as a formatted CDR bit stream.

26. The method of claim 24 wherein said signaling unit filter parameters comprise parameters selected from the group consisting of:
Origination Point Code;
Destination Point Code;
Abort Reason;
Application Type;
Calling Party Digits; and
Called Party Digits.

27. The method of claim 24 wherein said formatted TCAP CDR configuration signals comprise data selected from the group consisting of:
Date of Transaction Start;
Time of Transaction Start;
Date of Transaction End;
Time of Transaction End;
Calling Party Number;
Called Party Number;
Translated Number;
Mobile Identification Number;
Routing Number;
Account Number;
Electronic Serial Number;
Location Routing Number;
Point Codes; and
Actual Signaling Unit.

28. A system for generating Call Detail Records (CDRs) using transaction signaling units in a communications network, said system comprises: means for capturing signaling units on links in said communications network;
means for correlating said signaling units into transaction records;
means for filtering said transaction records to identify selected Transaction Control Application Part (TCAP) transaction records;
means for parsing desired data from signaling units in said selected TCAP transaction records;
means for combining said parsed desired data into formatted CDR signals;
means for sending said formatted CDR signals to a user's system;
means for storing said formatted CDR signals if communication to the user's system is interrupted during the sending of said formatted CDR signals so that the CDR signals cannot be sent to the user's system;
means for sending said stored formatted CDR signals to the user's system if communication to the user's system is restored so that formatted CDR signals can be sent to the user's system; and
means for receiving, by said system from said user's system, a sequence number indicating a next one of said formatted CDR signals that is to be sent when communication is restored.

29. The system of claim 28 wherein said means for filtering uses a filter configured by said user.

30. The system of claim 29 wherein said filter comprises:
parameters corresponding to components of said transaction signaling units.

31. The system of claim 28 wherein said means for parsing selects said desired data based upon a CDR format selected by said user.

32. The system of claim 28 further comprising:
a plurality of CDR profiles, each of said profiles comprising filter parameters and a desired CDR format; and
wherein a separate formatted CDR signal is created for each of said plurality of CDR profiles.

33. A computer readable medium for use in a system for monitoring a communications signaling network, the computer readable medium comprises:

means for correlating signaling units captured from said signaling network into transaction records;

means for filtering said transaction records to identify selected transaction records;

means for parsing desired data from signaling units in said selected TCAP transaction records;

means for combining said parsed desired data into formatted CDR signals;

means for sending said formatted CDR signals to a user's system;

means for storing said formatted CDR signals if communication to the user's system is interrupted during the sending of said formatted CDR signals;

means for sending said stored formatted CDR signals if communication with the user's system is restored; and means for receiving, from said user's system, a sequence number indicating a next one of said formatted CDR signals to be sent when the communication to the user's system is restored.

34. The computer readable medium of claim 33 further comprising:

means for configuring said means for filtering; and means for configuring a selected CDR format.

\* \* \* \* \*